Aug. 17, 1965     L. E. DAMON     3,201,561
WELDING APPARATUS

Filed Nov. 27, 1964     3 Sheets-Sheet 1

INVENTOR.
LLOYD E. DAMON
BY Robert H. Bachman
ATTORNEY

INVENTOR.
LLOYD E. DAMON
BY Robert H. Boehman
ATTORNEY

Aug. 17, 1965    L. E. DAMON    3,201,561
WELDING APPARATUS

Filed Nov. 27, 1964    3 Sheets-Sheet 3

INVENTOR.
LLOYD E. DAMON
BY Robert H. Boelgen
ATTORNEY 3,201,561
WELDING APPARATUS
Lloyd E. Damon, Wallingford, Conn., assignor to Olin Mathieson Chemical Corporation, a corporation of Virginia
Filed Nov. 27, 1964, Ser. No. 414,270
6 Claims. (Cl. 219—125)

This is a continuation-in-part of co-pending application Serial Number 203,224, filed June 18, 1962.

The instant invention relates generally to a welding apparatus, and more particularly to a semi-automatic welding apparatus for the joining of light gage sheet aluminum.

As is known, the use of aluminum sheet material of relatively small thickness is becoming more prevalent in various industries, for example in the construction of boats. In the past, joining of sheets of such thin material has been accomplished by riveting and the like, since it was considered inadvisable to use welding techniques on such thin sheets. Specifically, any weld in such an application must be made at a uniform and relatively rapid pace in order to avoid undesirable concentration of welding energy and heat at any given portion of the joint, which of course would cause puncture of the thin sheet metal at such portion. The desired rapid, but controlled, rate of welding may be accomplished by available automatic equipment, but such automatic equipment has such disadvantages as make them impractical of use. For example, such automatic equipment is exceedingly expensive, requires complicated track means to guide the apparatus, and is of too large a size for the close work often required in products using such thin sheets of aluminum.

While hand-operated welding guns are available and satisfactory for welds of a very short distance, the use of such guns has heretofore been considered unsatisfactory for welds of long distances. Specifically, the operator of such a gun is not able to move it along the joint to be welded fast enough to prevent burning holes through such light gage aluminum.

According to the instant invention, it has been found thta the above-noted disadvantages can be obviated by providing in combination with such a hand-operated welding gun a device which both guides and propels the gun along the joint at the required rate. Thus, the consumable electrode inert gas shielded metal arc process, referred to hereinafter as the MIG process, can be employed in performing welds at a speed as high as ten feet per minute on sheet material as light as 0.040 inch, for welds as long as 30 or 40 feet without stopping.

It is accordingly an object of the instant device to provide a semi-automatic welding apparatus for use in welding thin gage aluminum.

It is a further object of this invention to provide such a device which may be used without complicated jigs, fixtures, or tracks.

It is a still further object of this invention to provide such a device which is compact and inexpensive of construction.

Other objects will become apparent to those skilled in the art as a detailed description of a particular embodiment proceeds with reference to the drawings which form a part hereof, in which.

Figure 1:
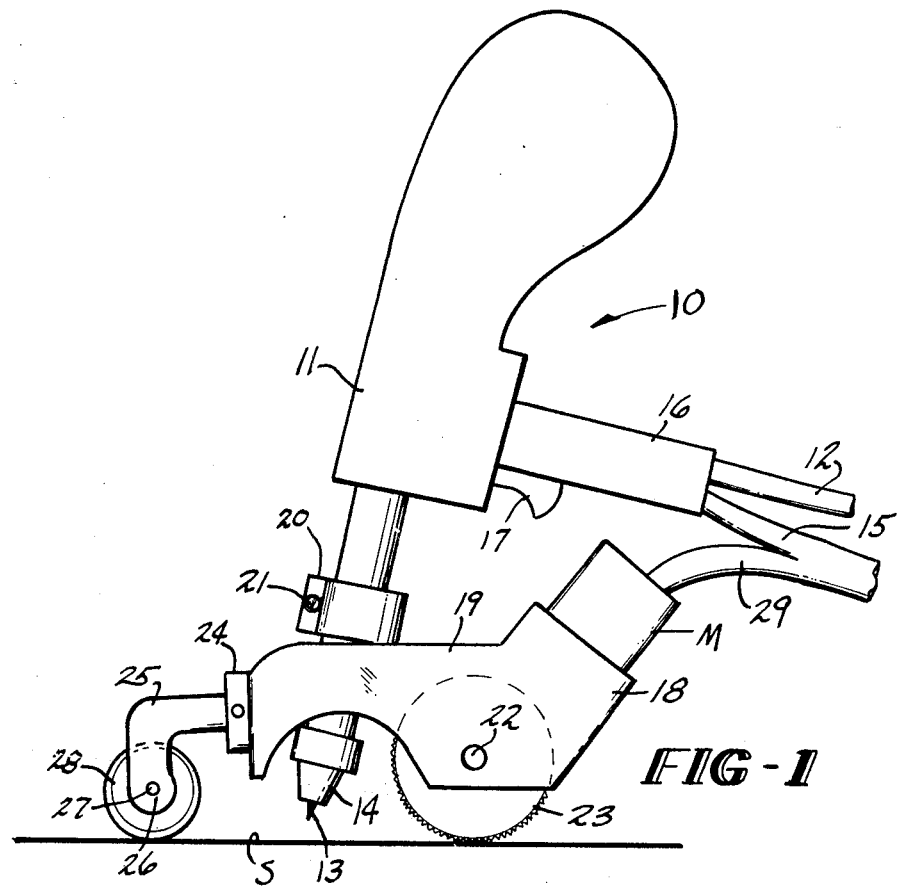
FIGURE 1 is a side elevational view of the instant welding apparatus.

Referring now to the drawings, and especially to FIGURE 1 thereof, there is illustrated an apparatus according to this invention identified generally by 10, comprising a hand-operated MIG welding unit 11 supported in and carried by a carriage assembly 18. The welding unit 11 is of a conventional type, for example that which may be obtained from Westinghouse Electric Company (SA–100) or Union Carbide Company (SWM–9). The welding unit 11 includes an inert gas supply means 12, a supply of weld wire 13, and a welding tip 14. Electrical power is delivered to the welding unit 11 through a suitable cable 15 which extends from an appropriate external circuit, not shown. The welding unit 11 may be grasped at its handle 16, and selectively actuated by the trigger 17.

The carriage assembly 18 comprises a chassis 19 to which is affixed a retaining means 20, through which may be passed the barrel of the welding unit 11, securing the welding unit 11 to the chassis 19 at a desirable angle for the welding tip 14 with respect to the seam to be welded. The retaining means 20 may take the form of a split collar, with suitable bolt means 21 for securely fastening the barrel of the welding unit 11 within the collar 20. At a rear portion of the chassis 19 there is supported an axle 22 which in turn supports a knurled drivewheel 23. At a front portion of the chassis 19 there is located a mounting means 24 to which there is adjustably fixed a support means 25. Support means 25, to be discussed in more detail hereinafter, includes a pair of split arms 26 between which there is supported an axle 27, for mounting of a guide wheel 28. Sutably connected to the drivewheel 23, and located at a rear portion of the chassis 19, is an adjustable-speed-drive motor assemly M, for delivering adjustable speed drive to the drive wheel 23. Such a motor assembly may be of any conventional type, for example that obtainable from Universal Electric Company, Model 7–039. Electrical power for the motor M is supplied through a suitable cable 29, extending from an external circuit not shown.

As will be obvious to those skilled in the art, various materials might be employed in the construction of the carriage assembly 18. It has been found best to construct the guide wheel 28 of a strong polymer, such as Teflon, and the drive wheel 23 of a knurled steel roll. The character of the gun and weld wire employed will obviously depend upon the material to be welded. For instance, in welding aluminum from 0.040 inch to approximately 0.125 inch, a MIG gun which uses a 1-lb. coil of wire is recommended. In welding material heavier than 0.125 inch a water-cooled gun which uses a 10-lb. coil will produce the best results. Usually, 0.030 inch diameter wire is recommended for the 1-lb. spool gun, but in certain conditions, one might use 0.048 inch diameter wire. When employing a 10-lb. coil gun, either 0.048 inch diameter or 0.062 inch filler can be used. The compact nature, and accordingly the flexibility of use, of the instant device can best be appreciated by considering that a suitable carriage assembly according to this invention need be only about six inches long.

By appropriate external control means, it will be seen that power to the motor M and power to the welding unit 11 may be coordinated with the supply of inert gas to achieve the desired and required relationship between the weld rate and the rate of travel of the unit. In use, it will be evident that the welding apparatus 10 is placed upon the seam S to be welded, as shown more clearly in FIGURE 2. The guide wheel 28 has a periphery of a configuration mating with the seam to be welded. Thus, it will be obvious that a variety of guide wheels 28 may be employed, the various wheels being easily interchangeable upon the shaft 27. When the unit is actuated, the guide wheel 28 will necessarily follow the seam, whatever pattern it might take. By a suitable connection of support means 25 to be discussed shortly, guide wheel 28 may be adjusted laterally. As power is supplied to the motor assembly M, the knurled drive wheel 23 grips the surface of the seam S and drives the entire carriage assembly 18 along with the welding unit 11. Simultaneously, a controlled delivery of inert gas is supplied through cable 12, and a controlled delivery of weld wire 13 is fed to the welding tip 14. The tip 14 may be spaced above the seam S by appropriately positioning the barrel of the welding unit 11 and securing same within the collar 20. Thus, the desired power and gas input may be coordinated by a control unit exterior of the welding unit 10, and the operator, after having made the required selections merely activates the unit by pressing trigger 17. As will be obvious, the thickness of the material being welded will also dictate the welding current and voltage, as well as the travel rate of the welding unit 10. Thereafter, the operator need only grasp the handle 16 of the device and depress the trigger 17, the guiding of the welding tip 14 being accurately held to the seam S by virtue of the guide wheel 28.

Figure 2:
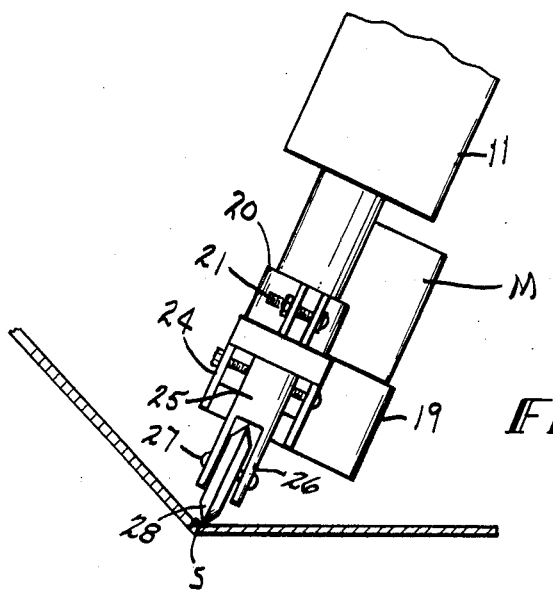
FIGURE 2 is a front elevational view of the welding apparatus in use.

As shown best in FIGURE 2, the instant welding apparatus is sufficiently compact so as to be used in a variety of welding conditions; as shown, the operator need only tip the device to achieve the desired relationship between the guide wheel 28 and the seam S. If further stability in such a welding condition were desired, a lateral guide mechanism might be mounted on the chassis 19 and adjusted to fix the preferred lateral angle. The use of such a lateral guide would provide a third reference point and thus an effective tripod support for the welding device.

Figure 3:
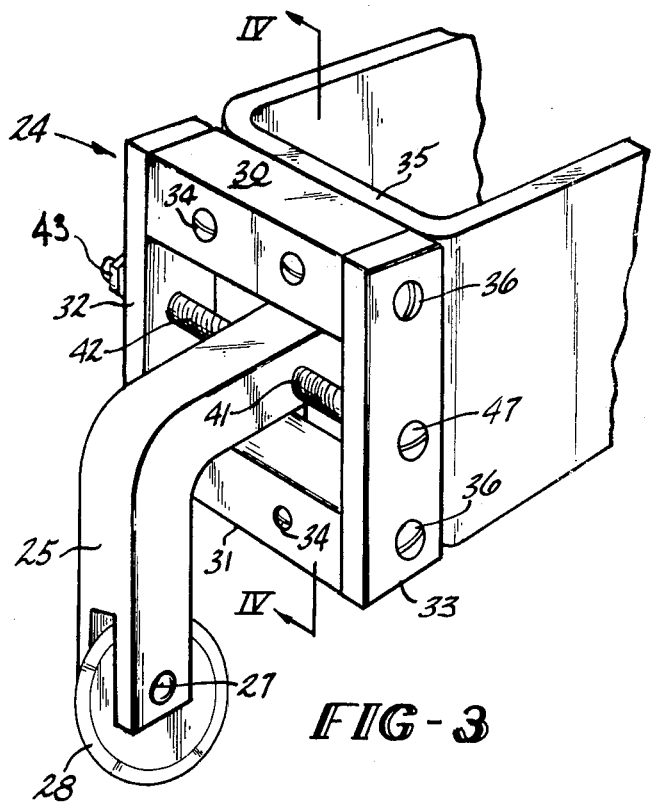
FIGURE 3 is a perspective view showing the details of one form of support means.
Figure 4:
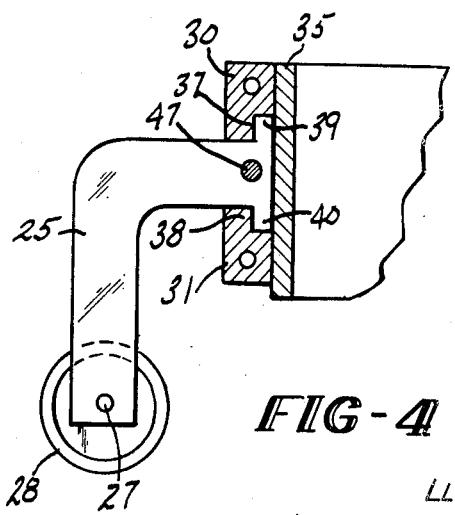
FIGURE 4 is a cross-sectional view of the device of FIGURE 3, taken along the line IV—IV thereof.

As has been indicated, it is advantageous that the support means 25 be laterally adjustable. Before beginning to weld a seam, the operator may then adjust the support means 25 so that as the guide wheel 28 engages the seam S, the welding tip 14 will be appropriately aligned with the guide wheel 28 for proper welding. Such lateral adjustment may be achieved by a unique construction of mounting means 24. One form which the mounting means 24 may take is shown in FIGURE 2 and in more detail in FIGURES 3 and 4. As shown in FIGURE 3, mounting means 24 comprises four bar-like members 30, 31, 32, and 33. Horizontal members 30 and 31 are each attached to a front portion 35 of the carriage assembly 18, as by fasteners 34. Vertical members 32 and 33 are in turn secured to the horizontal members 30 and 31, as by fasteners 36. As will be seen more clearly in FIGURE 4, member 30 has a notch 37 in its face adjacent the portion 35 of the carriage, and member 31 has a similar notch 38 in its face adjacent the portion 35 of the carriage. The support means 25, which supports at its lower end the guide wheel 28, has at its upper end two flange portions 39 and 40 of a configuration to slide in the notches 37 and 38. Additionally, support means 25 is apertured as at 41 and interiorly threaded to receive a bolt 42 which extends through appropriate unthreaded apertures in the vertical plates 32 and 33. Where the bolt 42 exits from the plate 32, a nut 43 may be provided to prevent the bolt 42 from slipping out of the assembly. It will be evident that rotation of the bolt 42 will cause the support means 25 to move laterally along the bolt 42; the mating threads on the interior of the aperture 41 and on the bolt 42 will cause the support means 25 to move laterally in accordance with the direction of rotation of bolt 42. Since the support means 25 is constrained to move within the grooves 37 and 38, all rotation of support means 25 is prevented. Thus, it can be seen that appropriate rotation of the bolt 42 will adjust the position of the support means 25 and hence guide wheel 28 to the desired position with respect to welding tip 14.

The mounting means 24 discussed above is quite satisfactory for welding seams which are substantially straight; once the initial adjustment of mounting means 24 is made, any slight curve in the seam may be accurately welded by merely tipping the entire welding apparatus laterally to keep the welding tip directly above the seam. However, for seams which are highly circuitous, it is advisable to be able to laterally adjust the support means while the apparatus is moving, so as to ensure that the welding tip is appropriately positioned with respect to the seam.

A second form which the mounting means may take accomplishes the above-noted advantages. This form is shown in FIGURES 5 and 6 and is referenced generally by the character 24'; elements analogous to elements of the previous embodiment will be referenced by the same numbers primed.

Figure 5:
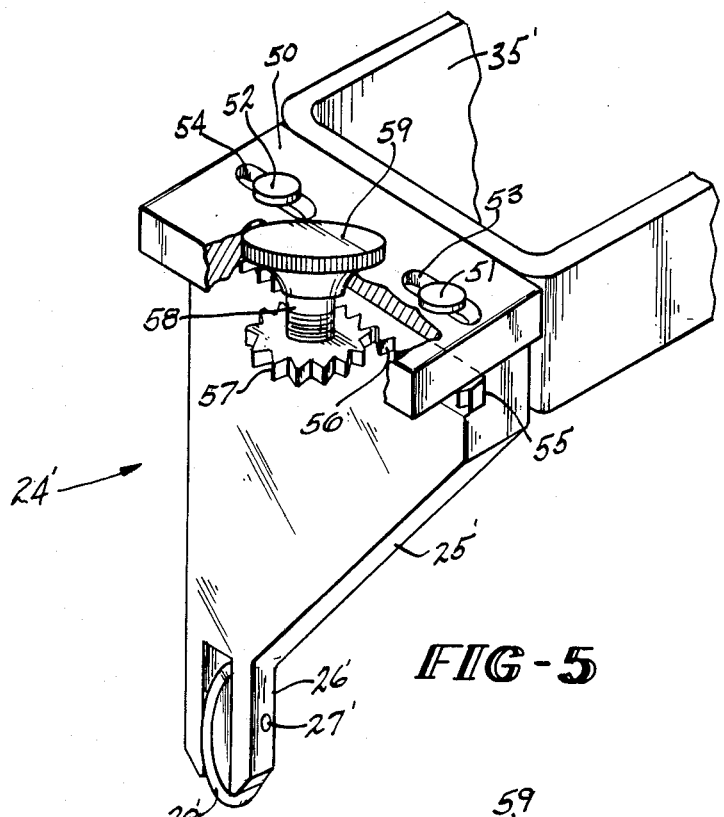
FIGURE 5 is a perspective view similar to FIGURE 3 showing a second form of support means.

Referring now to FIGURE 5, it will be seen that a bar member 50 is attached to a forward portion 35' of the carriage assembly 18, and suspends the support means 25' for adjustable lateral movement. Support means 25' includes leg elements 26', an axle 27', and a guide wheel 28'. At the upper face of the support means 25' are attached two pins 51 and 52, which project upwardly through two slots 53 and 54, respectively, of the plate 50. Pins 51 and 52 each have a head larger than the width of their grooves 53 and 54, such that the support means 25' may slide laterally with respect to the bar 50 by virtue of the pin and groove arrangement. In a laterally extended notch 55 of the support means 25' there is suitably secured a rack element 56. Engaged with the teeth of the rack element 56 is a gear 57, a threaded shaft 58 of which passes through a suitable aperture in the plate 50 and is connected to a knob 59.

Figure 6:
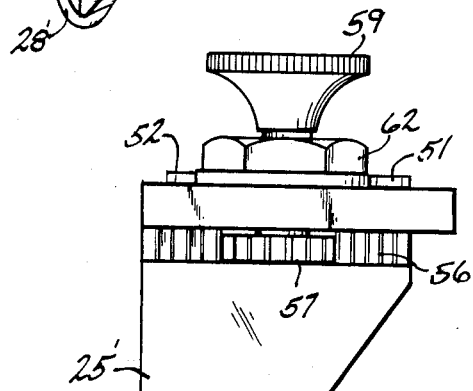
FIGURE 6 is a front elevational view of the support means of FIGURE 5.

As shown more clearly in FIGURE 6, rotation of the knob 59 will transmit a rotational motion to gear 57, the shaft 58 being rotatable within the aperture of plate 50. Since the support means 25' is free to move laterally, the rotational motion of gear 57 is transformed into translational movement of support means 25' due to the intermeshing of the gear 57 with rack 56. Accordingly, even while the entire welding unit is in motion, rotation of the knob 59 will result in translational adjustment of the support means 25 to various positions, two of which are shown in FIGURE 6 at 60 and 61. For long lengths of straight welding, a nut 62 which surrounds the shaft 58 may be turned down the threaded shaft 58 into engagement with the upper face of bar member 50 to secure the knob 69 against rotation.

It will be apparent from the foregoing description that there has been provided an apparatus for rapidly and controllably welding thin sheet aluminum which is believed to provide a solution to the foregoing problems and achieve the aforementioned objects. It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A compact, self-propelled, semi-automatic welding apparatus for welding a seam, comprising
  (A) a chassis,
  (B) a single drive wheel supported by said chassis at a rear portion thereof and being knurled for biting engagement with the surface to be welded,
  (C) power means supported on said chassis and operatively connected to said drive wheel for supplying drive power to said drive wheel,
  (D) means for supplying electric power to said power means,
  (E) a weld seam guide wheel supported by said chassis at a front portion thereof for engagement with said seam, said guide wheel having a periphery of a configuration mating with said seam, (F) a manually-operated MIG welding gun supported on said chassis, comprising
    (1) a welding tip in adjustable relationship with said seam
    (2) a welding wire,
    (3) a welding wire supply means operatively connected to said welding tip and said welding wire for feeding said welding wire at a controlled rate to said welding tip,
    (4) inert gas
    (5) inert gas supply means operatively connected to said welding tip for feeding said inert gas at a controlled rate to said welding tip;
(G) control means for coordinating said power means, said welding wire supply means, and said inert gas supply means, whereby actuation of said welding gun supplies a controlled delivery of welding wire and inert gas to said seam while the welding apparatus is propelled at a controlled rate along said seam.

2. The device of claim 1 wherein said weld seam guide wheel is laterally adjustable.

3. The device of claim 1 further including adjustable support means for supporting said weld seam guide from said chassis, said support means comprising:
    (A) guide wheel support means laterally slidbaly fixed to said chassis,
    (B) manually operated adjustment means on said chassis operatively connected to said guide wheel support means for moving said guide wheel support means laterally.

4. The device of claim 3 wherein said guide wheel support means includes a toothed rack, and said adjustment means includes a toother gear intermeshed with said rack, whereby said guide wheel may be moved laterally while said welding apparatus is being propelled by rotation of said gear.

5. The device of claim 4 wherein said adjustment means further includes a shaft connected to said gear, said shaft passing through an aperture in said chassis and having a knob for manual rotation of said shaft.

6. The device of claim 5 further including a locking means on said shaft for selective prevention of rotation of said gear.

References Cited by the Examiner

UNITED STATES PATENTS

| | | | |
|---|---|---|---|
| 1,580,020 | 4/26 | Cutler et al. | 219—125 |
| 1,826,186 | 10/31 | Morton | 219—125 |
| 1,965,331 | 7/34 | Chapman | 219—125 |
| 2,423,190 | 7/47 | Kennedy | 219—130 |
| 2,439,740 | 4/48 | Johnson | 219—125 |
| 2,847,558 | 8/58 | Mosny | 219—125 |

RICHARD M. WOOD, *Primary Examiner.*